(12) United States Patent
Yamaguchi et al.

(10) Patent No.: US 6,996,340 B2
(45) Date of Patent: Feb. 7, 2006

(54) AUTOMATIC PHOTOGRAPHY SYSTEM

(75) Inventors: Hiroshi Yamaguchi, Kaisei-machi (JP); Jun Enomoto, Kaisei-machi (JP); Mamoru Shinohara, Kaisei-machi (JP); Yoichi Nakamura, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/807,395

(22) Filed: Mar. 24, 2004

(65) Prior Publication Data

US 2004/0218916 A1    Nov. 4, 2004

(30) Foreign Application Priority Data

Mar. 25, 2003  (JP) .............................. 2003-083002

(51) Int. Cl.
*G03B 17/00*   (2006.01)

(52) U.S. Cl. .................................................. 396/263
(58) Field of Classification Search ............... 396/56, 396/59, 263, 266, 429, 502, 503; 348/130, 348/207.99; 382/100
See application file for complete search history.

(56) References Cited

U.S. PATENT DOCUMENTS

| | | | |
|---|---|---|---|
| 6,483,993 B1 * | 11/2002 | Misumi et al. | ............... 396/78 |
| 2001/0003189 A1 | 6/2001 | Miyazawa et al. | .......... 709/206 |

FOREIGN PATENT DOCUMENTS

JP    2000-347277 A    12/2000

\* cited by examiner

*Primary Examiner*—W. B. Perkey
(74) *Attorney, Agent, or Firm*—Birch, Stewart, Kolasch & Birch, LLP

(57) ABSTRACT

Photography is automatically performed when a subject assumes expressions or poses that are considered to be desirable. Shapes that represent facial expressions of human subjects are repeatedly extracted from images, which are being imaged by a camera. Degrees of match between the extracted shapes and predetermined shapes are calculated. The subjects are photographed when the calculated degrees of match exceed a predetermined value.

4 Claims, 7 Drawing Sheets

100% DEGREE OF MATCH

80% DEGREE OF MATCH

AUTOMATIC PHOTOGRAPHY SYSTEM

This Nonprovisional application claims priority under 35 U.S.C. § 119(a) on Patent Application No(s). 2003-083002 filed in JAPAN on Mar. 25, 2003, the entire contents of which are hereby incorporated by reference.

BACKGROUND OF THE INVENTION

1. Field of the Invention

The present invention relates to an automatic photography system, particularly to an automatic photography system that automatically performs photography when the expressions or poses of subjects satisfy predetermined photography criteria.

2. Description of the Related Art

There are known automatic photography systems. The systems are provided at certain spots within an attraction at theme parks and the like, and automatically perform photography when a ride passes or when human presence is detected. U.S. Patent Laid-Open No. 20010003189 discloses a type of automatic photography system. This type of system is provided at locations suitable for photography within an attraction, and performs photography of users automatically. The users may order prints, after confirming the contents of the photographed images on monitors or the like, at the exit of the attraction.

There are also known techniques for correcting photographs of people so that the people pictured therein are satisfied with the photographs. However, correction of photographs requires advanced techniques, and it is difficult to correct a photograph of a person with their eyes closed so that their eyes appear to be open, or to correct a photograph of a person who is not smiling so that they appear to be smiling. For this reason, Japanese Unexamined Patent Publication No. 2000-347277 discloses a method for automatically performing photography when predetermined photography criteria are satisfied. The criteria may be "eyes opened after being shut for approximately two seconds", "line of sight drew a predetermined trajectory", or the like. That the criteria are satisfied is determined by detecting changes in the eyes of a subject, such as when the subject blinks or changes the direction of their line of sight. When the photography criterion is "eyes opened after being shut for approximately two seconds", judgments are made regarding this condition by calculating the area of the whites of the eyes, based on image data. This is because when a person blinks, their eyeballs are hidden by their eyelids, and the whites of their eyes become difficult to see from the exterior. When the photography criterion is "line of sight drew a predetermined trajectory", judgments are made regarding this condition by determining the trajectory of the line of sight, by detecting vectors of lines normal to the irises of the eyes.

However, automatic photography systems, which are provided at main points in attractions, such as that disclosed in U.S. Patent Laid-Open No. 20010003189, automatically perform photography when subjects arrive at predetermined locations. As the photography is performed regardless of the expression or pose of the subjects, there are cases in which people are photographed when they are not ready to be photographed, that is, in states undesirable for photography.

In the photography method disclosed in Japanese Unexamined Patent Publication No. 2000-347277, characteristic elements such as the colors, the shapes, and the relative positions of the eyes are employed in an empirically established algorithm. Then, photography is performed when the photography criteria are satisfied. However, as the method does not recognize expressions or poses of people, there are cases in which people are photographed with expressions, or in poses different from those that they consider desirable for photography, when it is judged that the photography criteria are satisfied.

SUMMARY OF THE INVENTION

The present invention has been developed in view of the problems described above. It is the object of the present invention to provide an automatic photography system that automatically performs photography, only when subjects have expressions or are in poses that they consider to be desirable.

The first automatic photography system of the present invention comprises:

a photographing portion; and
a control portion comprising:
a shape extracting means, for repeatedly extracting shapes that represent expressions of human subjects within images, which are being imaged by the photographing portion;
a match calculating means for recording predetermined shapes in advance, and for sequentially calculating the degrees of match between the extracted shapes and the predetermined shapes; and
a control means for controlling the photographing portion to photograph the subjects when the calculated degrees of match exceed a predetermined threshold value.

Here, "shapes that represent expressions of human subjects" refer to one or a combination of characteristic shapes that represent facial expressions, such as facial outlines, shapes of eyes, and shapes of mouths.

The phrase "extracting shapes that represent expressions of human subjects" refers to extracting characteristic shapes that represent facial expressions, such as facial outlines, shapes of eyes, and shapes of mouths, from images, which are being imaged by the photography portion. Specifically, the shapes may be extracted by employing the Snakes method, which employs dynamic modeling. However, the extraction of shapes is not limited to being performed by the Snakes method. Any shape extracting means may be employed.

The "degrees of match" refer to the degrees that the shape or shapes that represent facial expressions match shapes considered to be preferable for photography (for example, the manner in which the corners of mouths rise, the shapes of eyes, and the positions of cheekbones). The degrees of match increase in value as the level of match increases.

The second automatic photography system of the present invention comprises:

a photographing portion; and
a control portion comprising:
a shape extracting means, for repeatedly extracting shapes that represent poses of subjects within images, which are being imaged by the photographing portion;
a match calculating means for recording predetermined shapes in advance, and for sequentially calculating the degrees of match between the extracted shapes and the predetermined shapes; and
a control means for controlling the photographing portion to photograph the subjects when the calculated degrees of match exceed a predetermined threshold value.

The "subjects" include people, animals, and birds. The "shapes that represent poses of subjects" refers to the outline shape of the subjects in predetermined poses, such as with one hand raised, facing front, and the like.

The phrase "extracting shapes that represent poses of subjects" refers to extracting subjects in predetermined poses from images, which are being imaged by the photographing portion.

There are cases in which the subject does not assume the predetermined shapes, regardless of how many times the shapes are extracted. Therefore, it is preferable that the predetermined threshold value is decreased according to an increase in the number of shape extractions.

In addition, there are some subjects for which the shapes that represent expressions or poses become the desired shapes quickly, and those for which the shapes that represent expressions or poses do not become the desired shapes quickly. Therefore, a configuration maybe adopted wherein identifying data is transmitted from the subjects, then received by the system; predetermined threshold values are recorded corresponding to the identifying data; and the photography portion is controlled based on the predetermined threshold values, which are recorded corresponding to the received identifying data. That is, the judgment standards for the degrees of match may be changed according to the subject.

It is preferable that the "identifying data" is that which is receivable in a wireless manner. It is possible to utilize identifying data, which is transmitted from IC cards or the like, held by the subjects.

The automatic photography systems of the present invention extract shapes that represent expressions and poses of human subjects from images, which are being imaged. Then, the systems calculate degrees of match between the extracted shapes and shapes which are considered to be desirable. The systems perform photography when the calculated degrees of match exceed predetermined threshold values. Therefore, it is possible to perform photography only in states that the subjects are in states preferable for photography. Accordingly, preferable photographs may always be provided.

A configuration may be adopted wherein the predetermined threshold values, that the degrees of match are compared against, are decreased according to increases in the number of shape extractions. In this case, it becomes possible to perform photography expediently, without wasting unnecessary time.

A configuration may also be adopted wherein identifying data is transmitted from the subjects, then received by the system; predetermined threshold values, which are judgment standards for the degrees of match, are recorded corresponding to the identifying data; and photography is performed employing the predetermined threshold values, which are recorded corresponding to the received identifying data. In this case, it becomes possible to perform expedient photography according to the subject.

DESCRIPTION OF THE PREFERRED EMBODIMENTS

Figure 1:
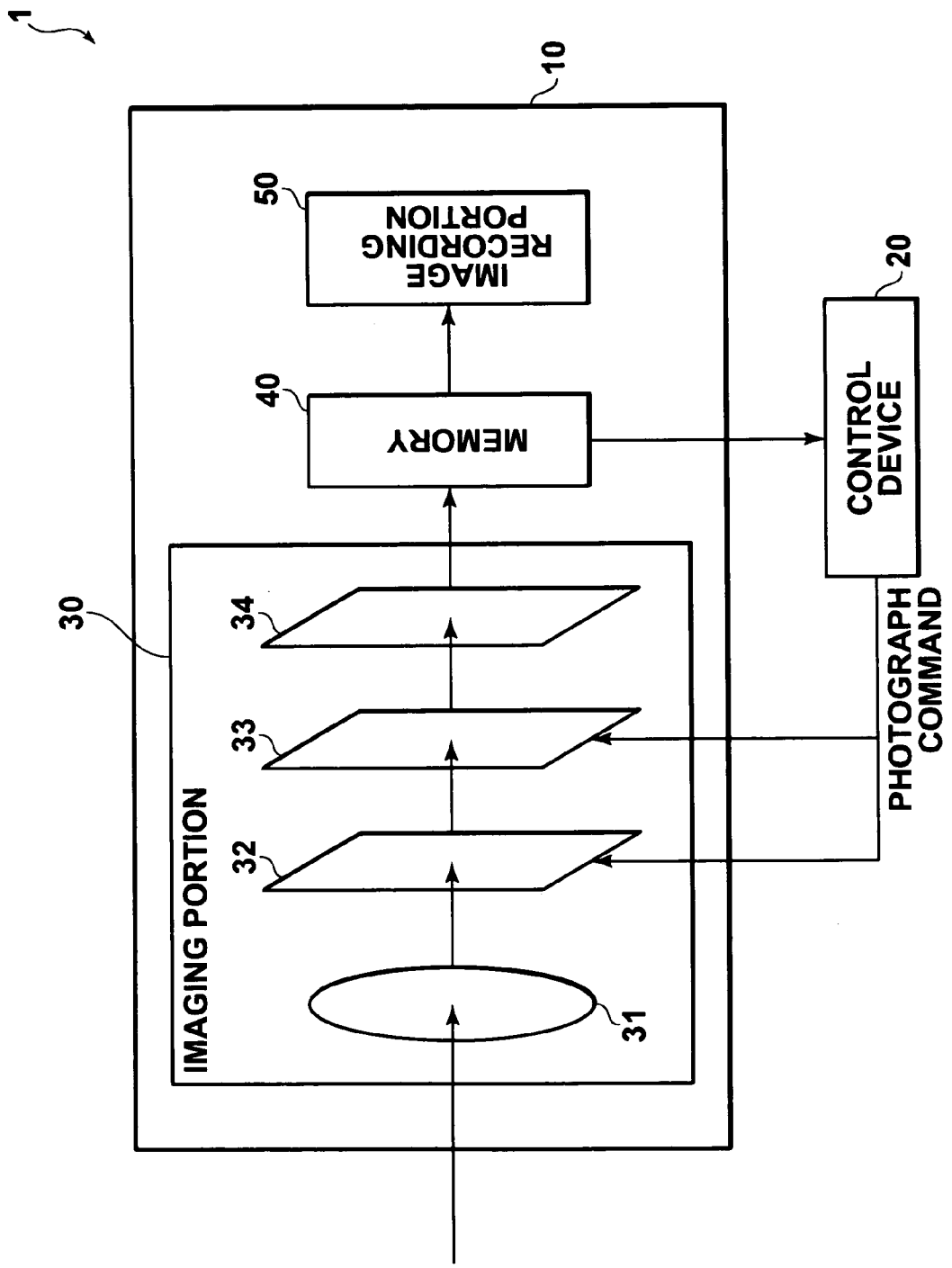
FIG. 1 is a block diagram illustrating the construction of an automatic photography system.
Figure 2:
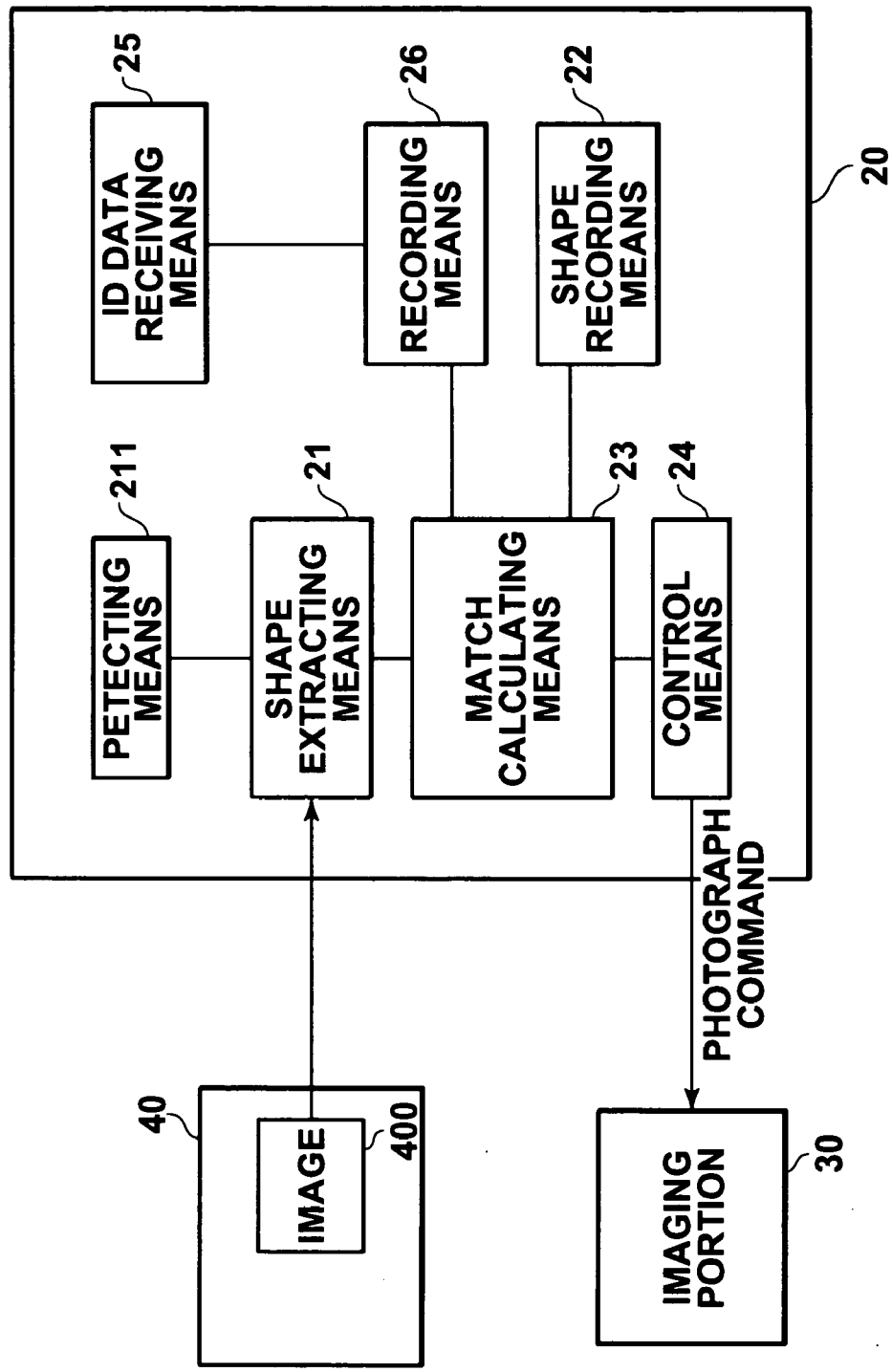
FIG. 2 is a block diagram illustrating the construction of a control portion f the automatic photography system.

Hereinafter, embodiments of the present invention will be described, with reference to the attached drawings. FIG. 1 is a block diagram illustrating the schematic structure of an automatic photography system 1 according to a first embodiment of the present invention.

The automatic photography system 1 comprises a photography device 10 such as a camera, and a control device 20. The control device 20 sends a photograph command to the photography device 10 to perform photography, when a human subject assumes a predetermined expression.

The photography device 10 (hereinafter, referred to as "camera") of the automatic photography system 1 comprises: an imaging portion 30, a memory 40, and an image recording portion 50. The imaging portion 30 comprises a lens 31 for forming images of subjects, an aperture 32 for adjusting amounts of exposure, a shutter 33 for adjusting exposure time, and an imaging element 34 such as a CCD or a CMOS image sensor, for converting light to electric signals. When a photograph command is received from the control device 20, the imaging portion 30 adjusts the focus of the lens 31, the speed of the shutter 32, the aperture 33 and the like, and obtains an image 400. The image 400 is temporarily stored in the memory 40, then sequentially accumulated in the image recording portion 50, by being transferred thereto from the memory 40. Note that the camera 10 of the present embodiment includes digital still cameras and digital video cameras that are capable of photographing still images.

The control device 20 comprises a shape extracting means 21, a shape recording means 22, a match calculating means 23, and a control means 24. The shape extracting means 21 extracts shapes that represent facial expressions of human subjects from images, which are imaged by the camera 10. The shape recording means 22 has recorded therein shapes of facial expressions considered to be desirable. The match calculating means 23 calculates degrees of match between the extracted shapes and the shapes recorded in the shape recording means 22. The control means 24 sends photograph commands to the camera 10 when the degrees of match exceed a predetermined threshold value (hereinafter, referred to as "threshold value")

The control device may further comprise an identifying data receiving means 25 and a recording means 26. The identifying data receiving means 25 receives identifying data, which is transmitted from the subjects. The recording means 26 records threshold values corresponding to the identifying data. In the case that the identifying data receiving means 25 and the recording means 26 are provided, the identifying data receiving means 25 receives identifying data from each subject. Then, degrees of match are judged according to each subject, by employing the threshold value recorded in the recording means 26.

The shape extracting means 21 is provided with a detecting means 211 for detecting whether a human subject is within a photographable range. When the detecting means 211 detects that a human subject is within a photographable range, the shape extracting means initiates extraction of shapes that represent human facial expressions from the images 400. The extraction of shapes is repeated until the degree of match, calculated by the match calculating means 23, exceeds the threshold value.

The detecting means 211 detects signals transmitted by IC cards or the like, which are held by the subjects. For example, the IC cards may adopt microwave RFID (Radio Frequency Identification) which are capable of long distance communications (maximum distance of about 5 meters). An RFID readout device (code reader) may be provided in the vicinity of the camera 10. In this case, it is possible to judge whether a subject is within a photographable range, by the RFID readout device detecting the IC cards, which are held by the subjects. Detection of the subjects is not limited to the method employing IC cards. Any method that enables judgment of whether subjects are within the photographable range may be employed. It is possible to judge whether the subjects are within the photographable range, by detecting the positions of the subjects utilizing cellular telephones or GPS devices held by the subjects. Alternatively, infrared sensors may be employed to judge whether subjects are in the vicinity of the camera 10.

The shape extracting means 21 extracts the subject from the image 400 when a subject is detected. Specifically, the background image is photographed at predetermined intervals in the absence of subjects. When the subject is detected within the photographable range, the subject may be extracted from the image by obtaining a difference image between the background image and the image having the subject therein. Alternatively, there are cases in which the position of the subject can be specified, by the signal transmitted from the IC card, the cellular telephone, or the GPS device held by the subject. In these cases, a region that is considered to contain an image of the subject may be extracted from the image, which is imaged by the camera 10, based on the position of the subject. Particularly in the case that the face portion is of interest, the shape of the extracted subject, whether skin colored portions exist and the like may be used as judgment criteria to extract the face portion.

It is possible to judge facial expressions of human subjects, based on the shapes of facial outlines, the shapes of the eyes, the shapes of the mouth, and the like. Therefore, the shapes of the facial outlines, the shapes of the eyes, the shapes of the mouth and the like may be extracted to judge the facial expressions. Only slight differences exist in the relative positions and shapes of facial outlines, eyes, and mouths among subjects. Therefore, it is possible to record patterns of relative positions and shapes in the shape recording means 22, then extract the shapes of the eyes and mouths based on the recorded shape patterns. Various methods may be employed to extract the shapes. In the present embodiment, a detailed description will be given for a case in which the Snakes method (a technique wherein optimal solutions are obtained based on an energy minimization principle) that employs dynamic modeling is applied.

Figure 3:
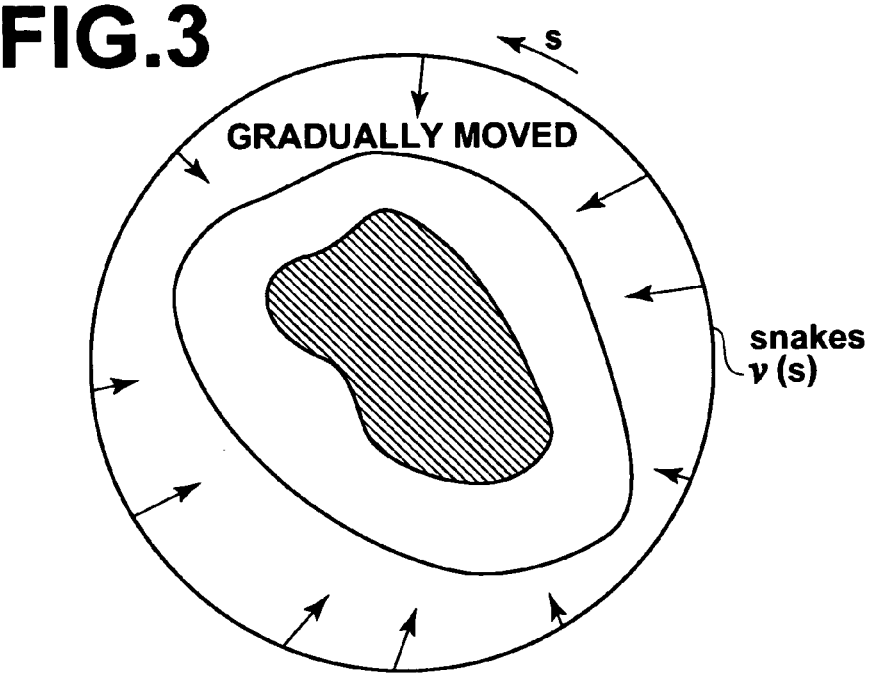
FIG. 3 is a diagram illustrating the operating principles of the Snakes method.

First, the operating principle of the Snakes method will be described with reference to FIG. 3. Snakes is a curve v(s), which has physical properties similar to a rubber band, and which is hypothetically placed within the image. The Snakes curve is placed in the vicinity of a shape to be extracted (the hatched portion). The shape is extracted by moving the curve so that the total sum of the image energy becomes extremely low on the Snakes curve. The image energy is defined to have extremely low values in the vicinity of the outline of the shape to be extracted.

Figure 4:
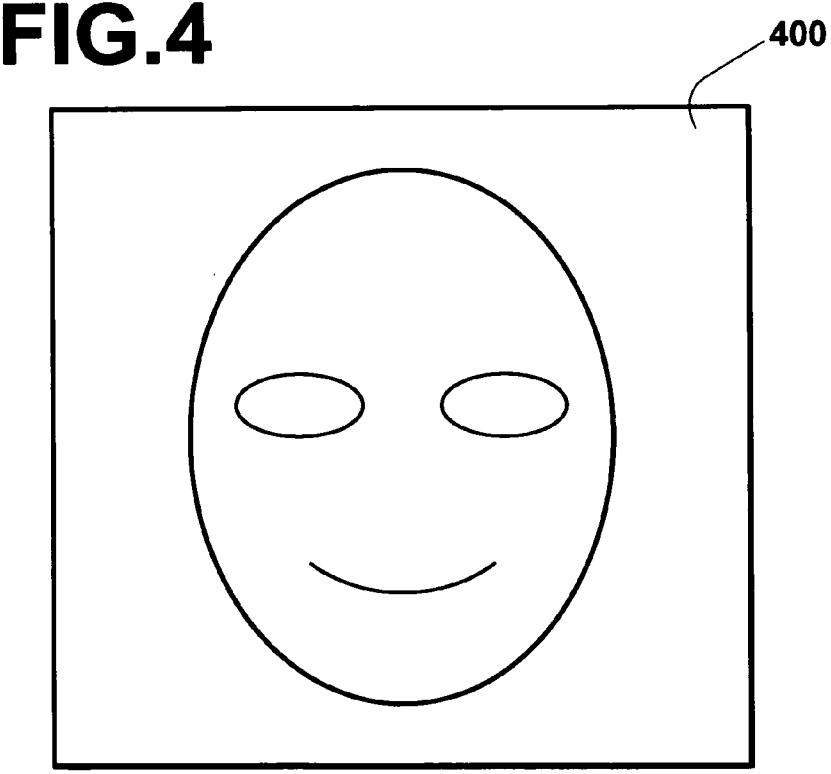
FIG. 4 is an example of a Snakes curve in its initial state, in the case that expressions are to be extracted.
Figure 5:
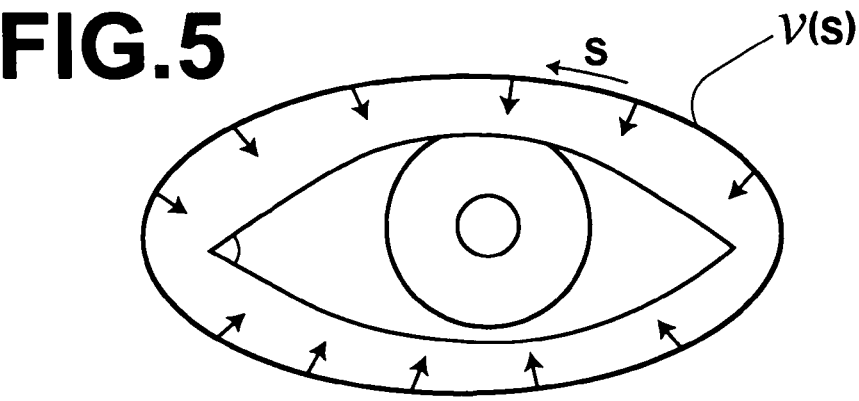
FIG. 5 is a diagram for explaining the extraction of the shape of an eye.

First, the initial position of the Snakes curve is set in the vicinity of the outline of the target shape. The target shapes, such as human eyes and mouths, are extracted by providing the Snakes curves in initial states in the shapes of a facial outline, eyes, and a mouth, as shown in FIG. 4. Then, the Snakes curves are moved so that the total sums of the image energy thereon become extremely low, on a target image 400, to extract the shapes of the facial outlines, the eyes, and the mouth.

Generally, the total sum E of image energy that determines the movement of the Snakes curve is given by the following Formula (1).

$$E=\int_0^1 \{Eint(v(s))+Eimage(v(s))+Eext(v(s))\}ds \quad \text{Formula (1)}$$

wherein Snakes: v(s)=(x(s), y(s)), and s: 0~1

Here, the Snakes curve is represented by v(s). s is a parameter on the curve. s=0 is the starting point, and s=1 is the endpoint.

Eint is interior energy of the Snakes curve, Eimage is image characteristics energy, which depends on the characteristics of the image, and Eext is exterior energy of an exterior force.

(1) Interior Energy Eint

The interior energy Eint is defined by a weighted linear sum of the squares of the length vs and the curvature vss of the Snakes curve, and is given by the following formula (2).

$$Eint(v(s)) = \frac{\alpha(s)|v_s|^2 + \beta(s)|v_{ss}|^2}{2} \quad \text{Formula (2)}$$

wherein:

$$v_s = \frac{dv}{ds};$$

$$v_{ss} = \frac{d^2v}{ds^2}; \text{ and}$$

$\alpha$ and $\beta$ are constants.

The interior energy Eint adjusts the divergence and convergence of the Snakes curve v(s).

(2) Image Characteristics Energy Eimage

The image characteristics energy Eimage is defined as energy, based on the image 400, that becomes extremely small in the vicinity of the target shape. The image characteristics energy Eimage is defined as values that represent characteristics of the image 400, such as the density, the density gradient, the hue gradient and the like thereof. Alternatively, the image characteristics energy Eimage may be defined as linear sums of these values.

(3) Exterior Energy Eext

The exterior energy Eext is deliberately provided. In the case that appropriate characteristics can be assumed for shapes to be extracted, or for the image 400 itself, appropriate exterior energies may be applied to change the behavior and the quality of the Snakes curves. By providing appropriate exterior energies Eext, the Snakes curves are adjustable so that they are enabled to obtain favorable results.

A case in which the shape of an eye is extracted will be described as a specific example. First, the facial portion is extracted from the image 400. Then, using the extracted facial outline as a standard, a curve v(s) having a standard shape of an eye is provided at a standard relative position of an eye, in its initial state. The image characteristics energy Eimage is defined to be extremely low at the vicinity of the outline of the eye, by employing the density, the density gradient, the hue gradient, or the like of the image. Next, the curve v(s) is gradually moved toward the outline of the eye so that the total sum E of the image energy thereon decreases. The curve v(s) converges where the total sum E of the image energy thereon becomes extremely low, where it substantially matches the shape of the eye. The shapes of the facial outline and the mouth may be extracted in the same manner.

The match calculating means 24 judges whether the shapes of the eyes and mouths, which have been extracted by the shape extracting means 21, represent desired expressions. For example, standardized shapes of eyes, mouths and the like when a subject is smiling may be recorded in the shape recording means 22 in advance, based on a plurality of images in which smiling subjects are pictured. Then, attention is focused on several portions that represent characteristics of a smiling face, such as the rising of the corners of mouths, the shapes of the eyes, the positions of the cheekbones. The degree of match is calculated by providing predetermined standards and evaluating whether the portions, on which attention is focused, are similar to the standardized shapes.

Figure 6A:
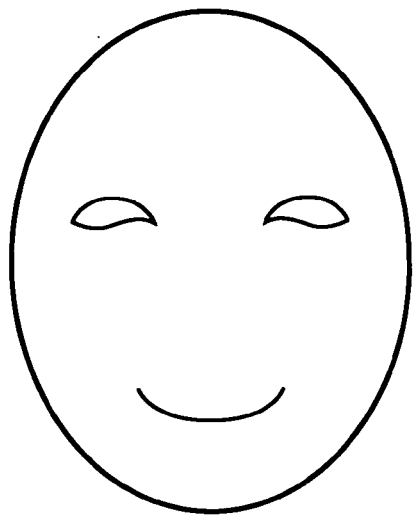
FIGS. 6A and 6B are diagrams for explaining the judgment of expressions.
Figure 6B:
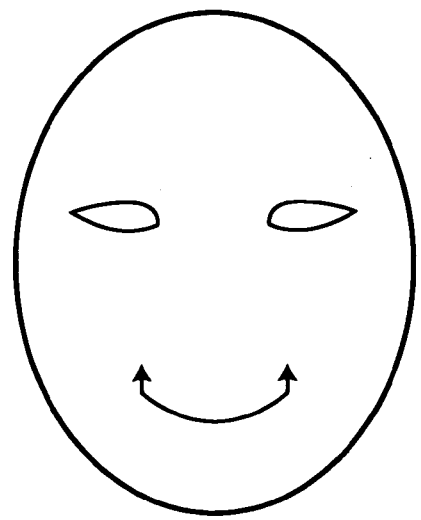

For example, regarding the corners of the mouth, a state in which the corners of the mouth gradually rise and approach a smile (FIG. 6B) is compared against a standardized shape (FIG. 6A), and the degree of match is output as a numerical value. Alternatively, a state in which the plurality of portions, on which attention is focused (such as the eyes and the facial outline), approach predetermined shapes may all be judged integrally. In addition, there are cases in which the characteristics of smiling faces differ from person to person. Therefore, it is desirable to prepare and record a plurality of standardized patterns, divided according to type.

The control means 25 sends photograph commands to the camera 10 when the degrees of match between the extracted shapes and the shapes which have been prepared in advance exceed a predetermined threshold value. However, there are cases in which the degrees of match do with the ideal shapes do not exceed the threshold value, despite repetitive shape extraction. Therefore, the threshold value, which is the standard against which the degrees of match are evaluated, may be decreased according to an increase in the number of shape extractions. For example, a perfect match with standardized shapes of a smiling face is expressed as 100% and photograph commands are initially sent when the degrees of match exceed 80% (refer to FIG. 6). In the case that the degrees of match do not exceed 80% despite repeated shape extraction, the photograph command may be sent when the degrees of match exceed 70%. In the case that the degrees of match do not exceed the lowered threshold value of 70%, the threshold value is lowered further. As an alternative, photography may be performed even if the degree of match does not exceed the threshold value, in the case that the number of shape extractions exceeds a predetermined number. As a further alternative, the degrees of match maybe calculated using a different pattern set (type) of standardized shapes. In addition, the threshold value may be decreased according to the number of times that the shape extraction is repeated, or according to the passage of time.

The system may also learn the shapes at the time of photography, and change the standardized shapes which are recorded in the shape recording means 22, as necessary.

The identifying data receiving means 26 receives identifying data, which has been transmitted from IC cards or the like held by the subjects. In the case that IC cards are employed, the same microwave RFID compatible for communication with that which is used for the detection means 211 is applied thereto. By providing an RFID readout device (code reader) int eh vicinity of the camera 10, it becomes possible to receive identifying data of the subjects. It is preferable that the identifying data receiving means 26 is that which is capable of transmitting and receiving identifying data in a wireless manner. In addition, the identifying data receiving means 26 may be integrated with the aforementioned detecting means 211 for detecting whether subjects are within a photographable range, as long as it is capable of receiving identifying data.

Here, the control means 25 decreases the threshold value during photography of a subject in the case that the degree of match does not reach a predetermined value. However, a configuration may be adopted wherein the threshold value used for photography is recorded in the recording means 27 for each subject, corresponding to the identifying data received by the identifying data receiving means 26. In this case, the next time that the same subject is photographed, the recorded threshold value may be employed in judgment. Accordingly, it becomes possible to perform judgment immediately.

Figure 7:
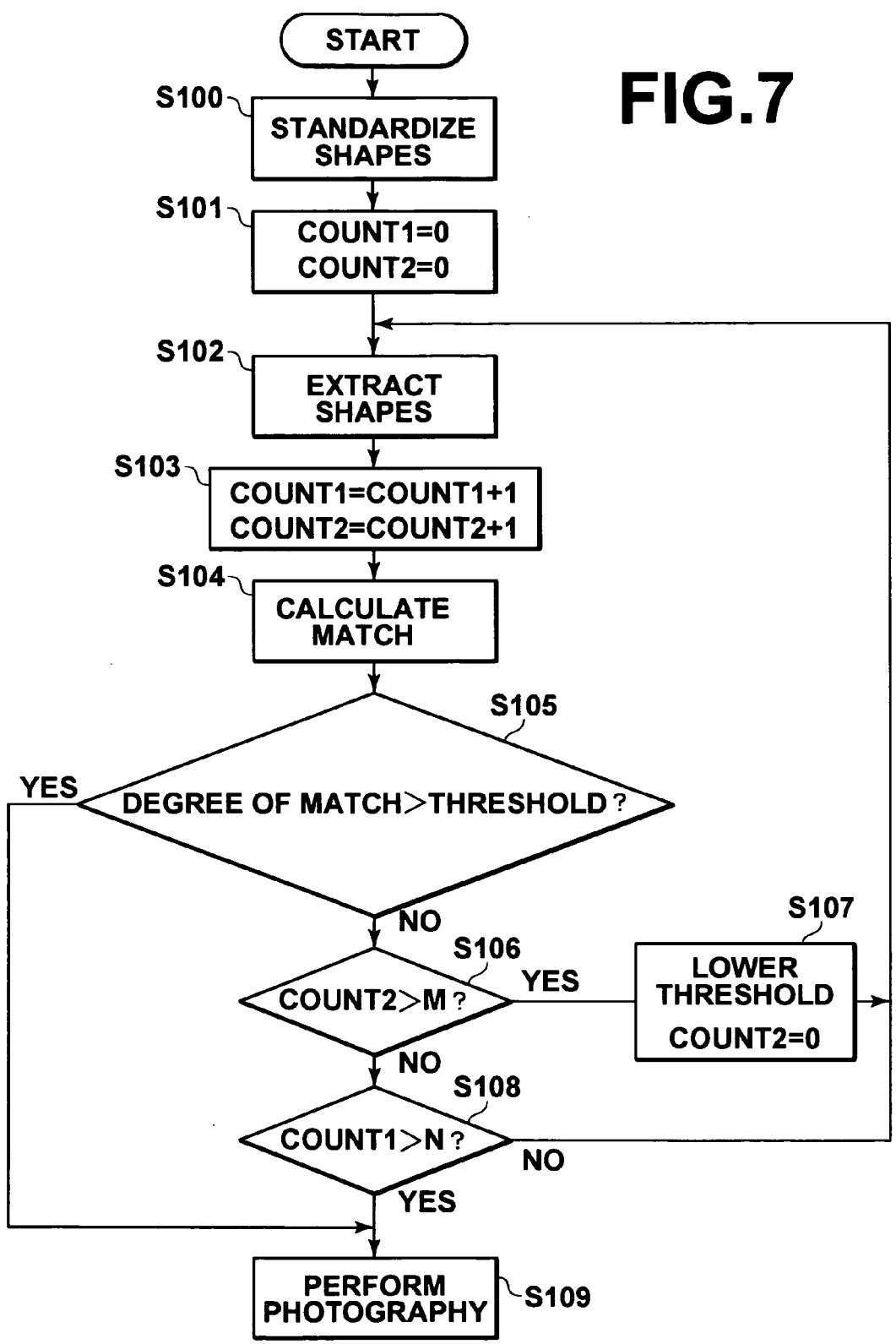
FIG. 7 is a flow chart illustrating the operation of the automatic photography system.

Here, the operation of the automatic photography system 1 will be described in detail, for a case in which photography is performed when a subject smiles, with reference to the flow chart of FIG. 7.

First, standardized shapes of eyes and mouths of smiling faces from a plurality of image data sets are recorded in the shape recording means 22 (step S100). At this time, it is desirable that the standardization is performed from as many image data sets as possible. It is also desirable that a plurality of patterns of standardized shapes are prepared and recorded, according to type.

When the detecting means 211 detects that a human subject as entered a photographable range, the shape extracting means 21 extracts the human subject from the image 400, which is imaged in the memory 40, and further extracts shapes that represent facial expressions, from the facial portion (step S102). The number of times that shape extraction is performed (Count 1, Count 2) is counted (steps S101, S103).

Degrees of match between the standardized shapes, which are recorded in the shape recording means 22, and the shapes, which are extracted by the shape extraction means 21, are calculated, while focusing attention on portions that are characteristic of smiles, such as the corners of the mouth, the eyes, and the positions of the cheekbones (step S104). In the case that the degree of match exceeds the threshold value, photography is performed (step S109). Photography is performed, for example, when the degree of match exceeds 80%, in the case that a perfect match with the standardized shape is set to be 100%.

In the case that the degree of match does not exceed the threshold value, shape extraction is performed again (step S102). Every time that the shape extraction is performed M times (Count 2), the threshold value is decreased (step S107), and the degree of match is judged against the decreased threshold value (step S105).

Further, in the case that the number of shape extractions (Count 1) becomes greater than or equal to a number N (which is a number higher than M) (step S108), photography is performed even if the degree of match does not exceed the threshold value (step S109). Alternatively, standardized shapes of a different type, which are recorded in the shape recording means 22, may be employed, and steps S102 through S108 repeated. As a further alternative, repetition of the process may be performed on the basis of elapsed time, rather than the numbers of shape extractions (M and N).

As described in detail above, it is possible to perform automatic photography when a human subject assumes expressions preferable for photography, by extracting shapes that represent human facial expressions.

Next, a second embodiment of the automatic photography system 1 of the present invention will be described. The second embodiment of the automatic photography system is that which performs photography when subjects assume predetermined poses. The construction of the second embodiment is substantially the same as that of the first embodiment. Therefore, detailed descriptions of common constituent parts will be omitted, and descriptions will be given only for different structures.

In the second embodiment, shapes that represent poses of subjects are recorded in the shape recording means 22 in advance. The shape extracting means 21 extracts shapes of the subject, based on the shapes representing poses, which are recorded in the shape recording means 22.

Figure 8:
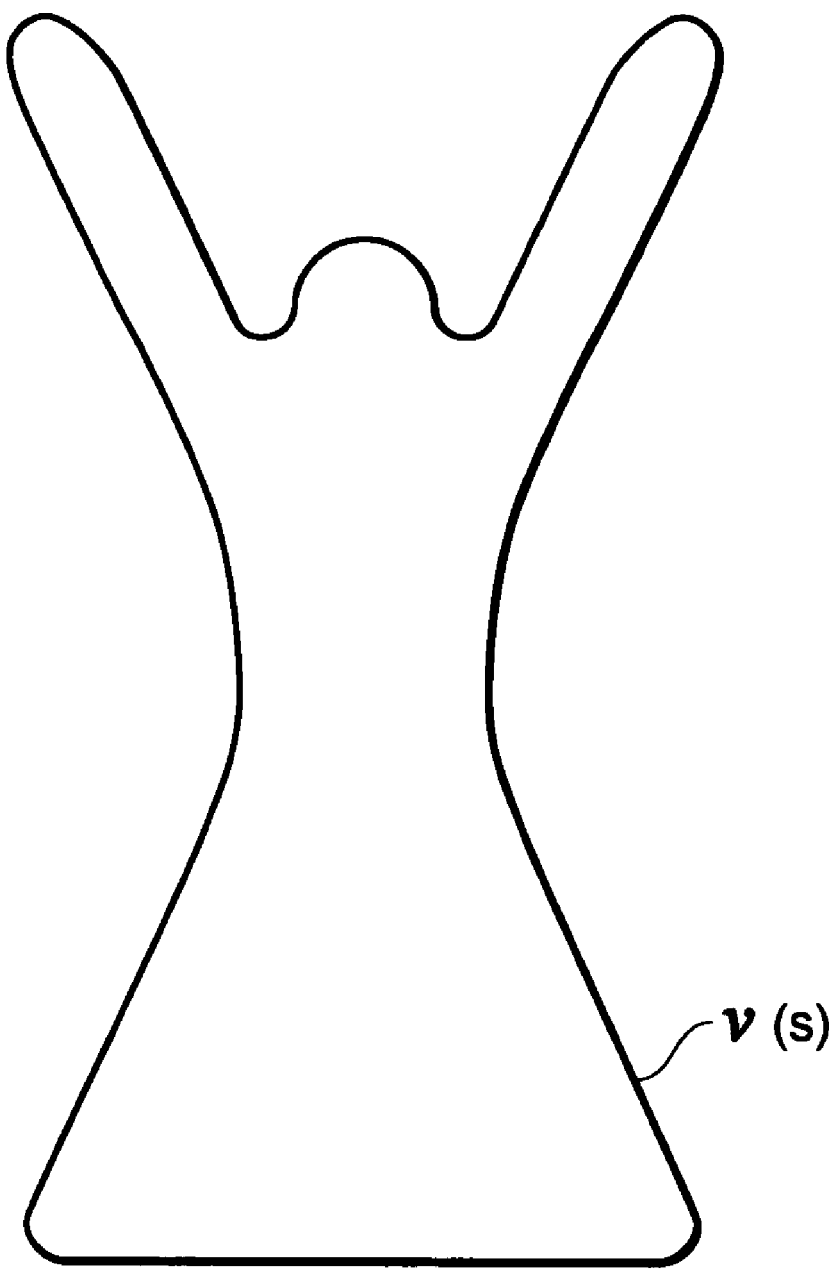
FIG. 8 is an example of a Snakes curve in its initial state, in the case that poses are to be extracted.

For example, in the case that a human subject, in a pose with both hands raised, is to be extracted by the aforementioned Snakes method, a curve v(s) that surrounds the pose of a human subject with both hands raised is provided as an initial curve, as shown in FIG. 8. Then, the image energy is defined so that the curve v(s) converges at the outline of the subject.

Figure 9:
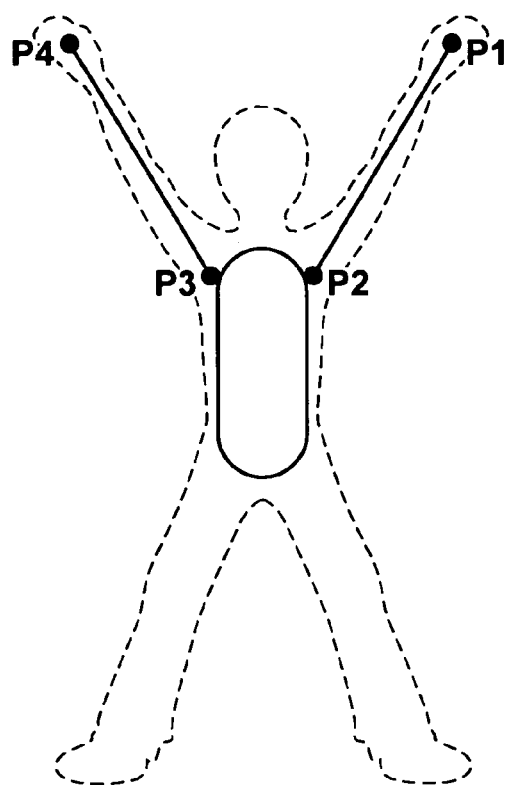
FIG. 9 is a diagram for explaining the judgment of poses.

Then, if the shape extracting means 21 extracts a shape represented by the dotted line of FIG. 9, the match calculating means 23 calculates a degree of match between the extracted shape and points P1, P2, P3, and P4, which are characteristic points within a shape of a human having both hands raised, recorded in the shape recording means 22. Photography may be performed when the degree of match reaches a predetermined value.

Here, a description has been given regarding human subjects. However, photography may be performed when animals, birds, and the like assume predetermined poses.

Figure 10:
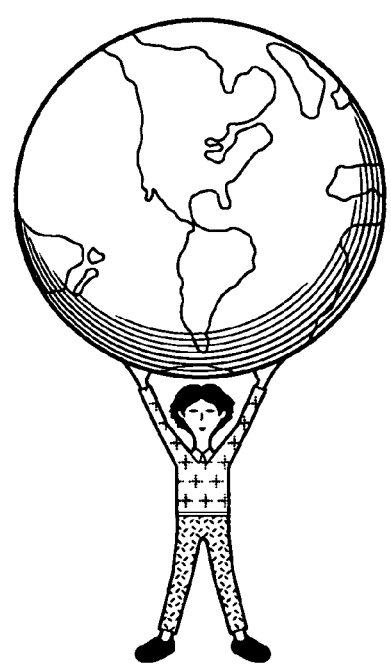
FIG. 10 is an example of a composite image formed by a photographed image.

In this manner, it is possible to perform automatic photography when subjects assume predetermined poses. An image of a human subject with both hands raised may be combined with an image of the earth as shown in FIG. 10, for example, to create a composite image in which the human subject appears to be lifting the earth. Creation of composite images, picturing subjects photographed in predetermined poses and another desired image, is facilitated.

In the embodiments described above, a plurality of subjects may be subject to match degree calculation, and photography may be performed when all of the degrees of match exceed a predetermined value. Alternatively, the degrees of match of the plurality of subjects may be considered as a whole when performing photography.

What is claimed is:

1. An automatic photography system comprising:
a photographing portion; and
a control portion comprising:
a shape extractor, for repeatedly extracting shapes that represent expressions of human subjects within images, which are being imaged by the photographing portion;
a match calculator for recording predetermined shapes in advance, and for sequentially calculating the degrees of match between the extracted shapes and the predetermined shapes; and
a controller for controlling the photographing portion to photograph the subjects when the calculated degrees of match exceed a predetermined threshold value, wherein:
the predetermined threshold value is decreased according to an increase in the number of shape extractions.

2. An automatic photography system as defined in claim 1, wherein:
the control portion further comprises:
an identifying data receiver, for receiving identifying data, transmitted from the subjects, that identifies the subjects; and a memory for recording predetermined threshold values corresponding to the identifying data of the subjects received by the identifying data receiver; wherein:
the controller controls the photographing portion based on the predetermined threshold values which are recorded in the memory means, corresponding to the received identifying data.

3. An automatic photography system comprising:
a photographing portion; and
a control portion comprising:
a shape extractor, for repeatedly extracting shapes that represent poses of subjects within images, which are being imaged by the photographing portion;
a match calculator for recording predetermined shapes in advance, and for sequentially calculating the degrees of match between the extracted shapes and the predetermined shapes; and
a controller for controlling the photographing portion to photograph the subjects when the calculated degrees of match exceed a predetermined threshold value, wherein:
the predetermined threshold value is decreased according to an increase in the number of shape extractions.

4. An automatic photography system as defined in claim 3, wherein:
the control portion further comprises:
an identifying data receiver, for receiving identifying data, transmitted from the subjects, that identifies the subjects; and
a memory for recording predetermined threshold values corresponding to the identifying data of the subjects received by the identifying data receiving means; wherein:
the controller controls the photographing portion based on the predetermined threshold values which are recorded in the memory, corresponding to the received identifying data.

* * * * *